Patented Sept. 9, 1941

2,255,210

UNITED STATES PATENT OFFICE 2,255,210

PROCESS FOR THE RECOVERY OF TUNGSTEN

John J. Furey, Niagara Falls, N. Y., assignor to Electro Metallurgical Company, a corporation of West Virginia No Drawing. Application April 22, 1939, Serial No. 269,468

4 Claims. (Cl. 23—19)

The invention relates to the treatment of materials to recover metals therefrom and particularly to a method for the recovery of tungsten from compounds such as ores, concentrates, and the like in which molybdenum is associated with the tungsten.

In the production of tungsten from its ores by methods heretofore known, the presence of some molybdenum as molybdenite does not ordinarily introduce any great difficulty because molybdenum in this form may usually be separated from the tungsten by mechanical means. However, certain tungsten ores, particularly the scheelite ores, contain a substantial proportion of molybdenum as an isomorphic replacement of tungsten in the ore. Molybdenum present in such form is not separable by known mechanical means.

It is possible to separate tungsten from such ores by decomposing the ore with concentrated hydrochloric acid, care being taken to avoid dilution or depletion of the acid, and subsequently recovering the tungsten as a residue of tungstic acid, either by decanting the acid solution without permitting it to become diluted or by filtering and washing the residue with concentrated acid. Molybdenum is soluble in concentrated hydrochloric acid but is insoluble in dilute hydrochloric acid, and unless concentrated acid is employed throughout the filtering or decanting operations precipitation of the molybdenum occurs.

Difficulties are encountered when concentrated hydrochloric acid is used throughout the process. Such acid is strongly corrosive and requires special, relatively expensive apparatus and equipment in order to handle it in the final steps of the process. Also, it is necessary to employ and maintain large amounts of the acid in concentrated form to effect satisfactory separation of the molybdenum and the tungsten. The method, therefore, is sensitive to slight variation in acid concentration, is relatively expensive, and is not readily applicable to large scale commercial operation.

The present invention provides a method free from the above disadvantages for the recovery of tungsten from ores and other compounds of tungsten in which molybdenum is associated with the tungsten.

The present invention is based on the discovery that in ores and other materials containing both molybdenum and tungsten, the molybdenum and tungsten may be separated efficiently by treating the material with concentrated hydrochloric acid in the presence of an agent which slowly reacts with the acid to liberate hydrogen, diluting the solution formed thereby, and subsequently recovering the tungsten as a residue of tungstic acid without precipitating the molybdenum from the solution.

Suitable agents which are continuously but slowly attacked by the hydrochloric acid include ferrous and non-ferrous metals, either alone or in combination with a second material or materials which retard the action of the acid, for instance ferrosilicon (containing about 15% silicon), high speed steel grindings and nickel. It is believed that hydrogen slowly liberated by the interaction between the metallic agent and the hydrochloric acid is the effective material in preventing precipitation of the molybdenum in dilute acid solution. Although it is impractical to use agents which react rapidly with the acid to evolve hydrogen rapidly, such as iron, by employing an inhibitor which acts to retard the rate of reaction in the acid solution, for example quinoline, it is possible successfully to use iron or other agents which normally would be rapidly attacked with resultant rapid evolution of hydrogen.

As a specific example, the application of the invention to the treatment of a tungsten ore, scheelite, will be given. An ore containing 53.5 tungsten ($WO_3=67.49\%$), and 2.26% molybdenum (present as $MoS_2=0.22\%$), was roasted, thereby converting the molybdenum sulphide to oxide. A charge consisting of 50 parts by weight of the roasted ore, ground to pass a 200 mesh screen (0.074 mm. opening), was intimately mixed with 5 parts of ferrosilicon (containing about 15% silicon) ground to pass a 100 mesh screen (0.015 mm. opening). This mixture was leached with 130 parts of concentrated hydrochloric acid (about 36%) in a suitable tank for seven hours, the solution so formed being maintained at a temperature of about 40° C. throughout the leaching operation. The solution was then boiled for about one-half hour, diluted with water to twice its original volume, and filtered to separate the tungstic acid precipitate from the acid solution containing molybdenum. During the filtering step the residue was thoroughly washed with water. An analysis of the residue showed it to contain 57.94% tungsten and only 0.09% molybdenum. If desired, the solution prior to being filtered may be diluted considerably more than is indicated in the foregoing example without causing the molybdenum to precipitate.

The invention is not limited to the use of the specific agents herein mentioned for providing a source of hydrogen, many other metallic agents, employed alone or with a suitable inhibitor, will produce a constant, slowly evolved supply of hydrogen upon interaction with hydrochloric acid.

Further, although the invention has been specifically described in its application to the recovery of tungsten from scheelite ores, the method of the invention may be employed in the separation of molybdenum from other ores of tungsten or other tungsten-containing materials soluble in concentrated hydrochloric acid.

I claim:

1. Method of recovering tungsten from an ore material containing tungsten and molybdenum which comprises reacting the material with hydrochloric acid in the presence of an added metal which slowly reacts with said acid to liberate hydrogen, and separating tungstic acid from the molybdenum-containing solution so formed.

2. Method of recovering tungsten from ore material containing tungsten and molybdenum which comprises reacting the material with hydrochloric acid in the presence of an added metal which reacts rapidly with hydrochloric acid and an agent which slows the rate of reaction between said metal and said acid, and separating tungstic acid from the molybdenum-containing solution so formed.

3. Method of recovering tungsten from ore material containing tungsten and molybdenum which comprises reacting the material with hydrochloric acid in the presence of an added nonferrous metal which slowly reacts with said acid to liberate hydrogen, and separating tungstic acid from the molybdenum-containing solution so formed.

4. Method of recovering tungsten from ore material containing tungsten and molybdenum which comprises reacting the material with concentrated hydrochloric acid in the presence of ferrosilicon, diluting the molybdenum-containing solution formed thereby, and separating tungstic acid from said solution.

JOHN J. FUREY.